Nov. 12, 1957 J. CASALINO 2,812,874
REINFORCED DOUBLE WALL CONTAINER
Filed Aug. 17, 1955
FIG. 1.
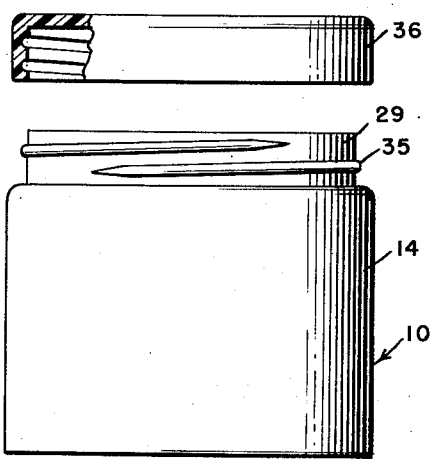
FIG. 4.
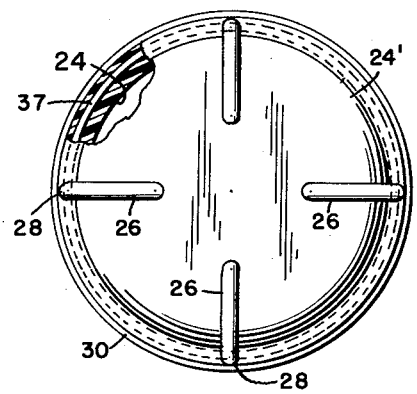
FIG. 2.
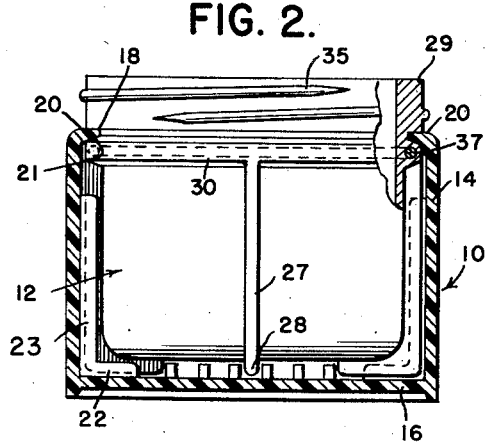
FIG. 5.
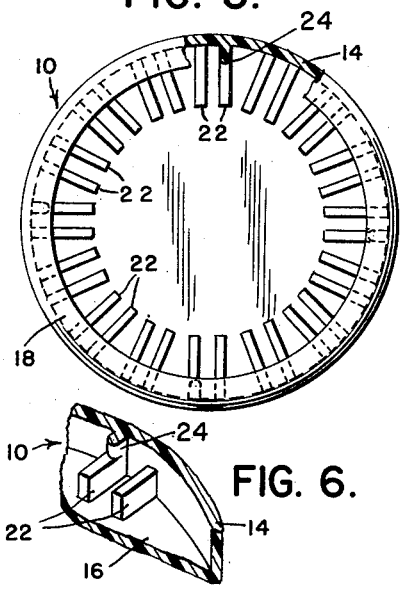
FIG. 6.
FIG. 3.
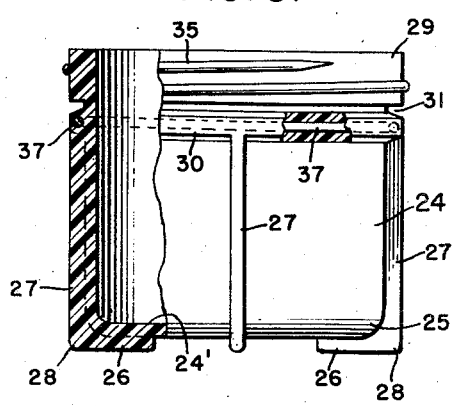
FIG. 7.
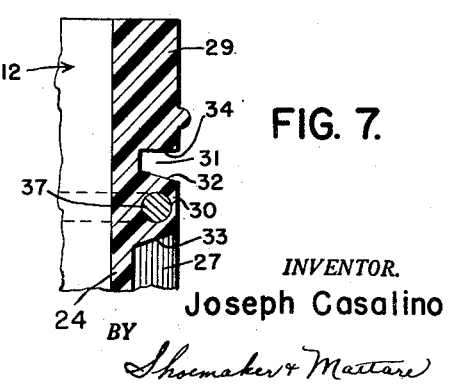
INVENTOR.
Joseph Casalino
BY
Shoemaker & Mattare
ATTORNEYS United States Patent Office 2,812,874
Patented Nov. 12, 1957

2,812,874

REINFORCED DOUBLE WALL CONTAINER

Joseph Casalino, Forest Hills, N. Y., assignor to Plastic Molded Arts Corp., Long Island City., N. Y., a corporation of New York Application August 17, 1955, Serial No. 528,947

9 Claims. (Cl. 215—13)

This invention relates to improvements in receptacles of the nature of jars, pots and the like intended to contain ointments, salves, cold creams and other preparations of like consistency either of a medicinal or cosmetic character and also dry preparations such as powders and the like.

More specifically the present invention is directed to new and useful improvements in jars, pots and the like molded or otherwise fashioned of plastic materials of the synthetic resin class such, by way of example, as polyethylene.

Pots and jars of the type designed to contain ointments, salves, creams and the like, have heretofore been made of molded glass and in more or less standard form and in standard sizes and such articles are conventionally made of heavy or thick wall construction in order to withstand shocks incident to repeated handling, without breaking.

Glass pots and jars are made in forms or molds and to produce such articles of synthetic resins in forms or molds so as to have the capacities and external dimensions corresponding to those of molded glass, involves certain techincal difficulties well understood by those versed in the art of molding plastics and its is accordingly a particular object of the present invention to provide a new and novel pot or jar in plastic or synthetic resin, having the overall dimensions of conventional pots or jars but having walls of hollow form, so designed as to withstand deforming pressures and also to effect an economical advantage by reducing the amount of the relatively expensive plastic material required.

Another object of the invention is to provide, in a manner as hereinafter set forth, a hollow wall pot or jar of synthetic resin material which is initially produced in two molded units, with a new and novel means for joining the same together without the employment of bonding cements or any other bonding material but in such a manner as to effectively resist subsequent separation of the units.

A receptacle such as that contemplated by the present invention, constructed in the manner of the present invention of polyethylene or other similar or suitable synthetic resin is of yielding or deformable character. Accordingly, it is another object of the invention to provide, in a manner as hereinafter set forth, a new plastic or synthetic resin receptacle of hollow wall form made up initially of two molded members, each complete and finished in itself and formed to be inserted one into the other, with a novel means for effecting an interlocking coupling between the two members or units when so assembled or brought together whereby to produce a pot or jar having the appearance of being of one-piece construction and substantially incapable of being separated into the original two members without being destroyed.

Still another object of the invention is to provide a new plastic or synthetic resin receptacle of hollow wall form embodying or made up of two interengaged or nested molded members wherein a novel coupling or interlocking connection is formed between the members, the establishment of which utilizes the inherent elastic or yielding characteristics of the polyethylene plastic and the maintenance of the coupling or connection and wherein a rigidifying means is provided which, after the establishment of such coupling or interlocking connection, effectively resists the separation of the members.

Yet another object of the invention is to provide, in a manner as hereinafter set forth, a new plastic or synthetic resin receptacle of hollow wall form embodying two molded cup-like members or units fitted one into the other, wherein the members or units are of circular form and the completed receptacle is, of course, of the same circular form, with novel means for interconnecting or coupling together opposing wall surfaces to prevent the relative rotation of the two members or units and for also rigidifying the spaced side walls to resist deformation by compression from within or from without.

The foregoing and possibly other objects are attained by the provision of an outer cylindrical open top body and an inner body of cup-like form designed to have the major lower portion thereof inserted into the outer body.

The outer body is provided with an inturned locking flange around the top opening thereof, which flange has an inclined or tapered under face and the inner body is provided with an encircling rib slightly below the top thereof and which rib has sloping upper and under surfaces, the upper surface being spaced from the remaining top part of the body, providing a channel into which the locking flange of the outer body is engaged when the inner body is inserted into the outer body.

The inside diameter of the flange is approximately equal to the diameter of the bottom of the channel and the flexible character of the plastic material of which the bodies are formed facilitates the flexing of the flange sufficiently when the inner body is forced downwardly into the outer body, to permit the flange to snap into the channel and thus completely fill and tightly grip the inner body in the bottom of the channel. The inclined under face of the rib also assists in the flexing action of the flange in the operation of assembling the bodies and the inclined upper face of the rib against the inclined under face of the flange tightly presses, forms a camming surface so as to draw the edge of the flange tightly into the channel, thereby forming a tight and substantially invisible joint between the bodies.

In order to resist subsequent separation of the bodies by deforming the upper part of the inner body in order to disengage the flange from the channel, a rigidifying means in the form of a wire is embedded in the rib over which the flange engages, and encircles the inner body.

Additional means is provided for maintaining the bodies in desired coupled relation and to prevent rotary movement between the inner and outer bodies and also to prevent to some extent deformation or collapsing of the hollow wall, in the provision of radial ribs formed along the inner surface of the bottom and side walls of one of the bodies for engagement with ribs formed on the opposing wall face of the other body, which ribs upon the two opposing wall surfaces come into interlocking engagement when the bodies are assembled.

The invention will be best understood from a consideration of the following detail description taken in connection with the accompanying drawing forming a part of the specification, with the understanding that slight changes or modifications may be made in the invention so long as such changes or modifications mark no material departure from the salient features of the invention as expressed in the appended claims.

In the drawing:

Fig. 1 is a view in side elevation of a jar or pot constructed in accordance with the present invention and showing a conventional type of cap therefor, the cap being partly in section.

Fig. 2 is a view in vertical transverse section through the outer member or body only of the pot, the inner body member being in elevation.

Fig. 3 is a view partly in side elevation and partly in vertical section of the inner body or cup member showing the rigidifying wire in the rib, a portion of the rib being broken away to show the wire in elevation, the section being taken through one of the vertical side wall ribs which joins the encircling rib.

Fig. 4 is a bottom view of the inner or cup body with a portion of the side wall broken away and in section showing the rigidifying wire.

Fig. 5 is a top view of the outer body looking down into the same, a portion of the side wall being in section to show one of the vertical side wall ribs.

Fig. 6 is a fragmentary detail of a portion of the bottom and side wall of the outer body showing two or a pair of the bottom ribs and the lower end of a side wall rib joined to one of the bottom ribs.

Fig. 7 is a fragmentary detail on an enlarged scale showing the encircling locking rib of the inner body, a portion of the rigidifying wire therein and, in elevation, a portion of a vertical side wall rib extending down from the encircling rib.

Referring now more particularly to the drawing, it will be seen that the body of the receptacle in the form of a pot or jar comprises two separate or independently formed body parts or members which are designated 10 and 12, the body or member 10 comprising the outer member or shell and the body or member 12 comprising the inner cup-like part of the structure.

As hereinbefore set forth the pot or jar of the present invention is formed of a suitable plastic material and by the use of the term "plastic" any synthetic resin suitable for the purpose is meant. In this connection the plastic polyethylene is preferred but it is to be understood that while this has been found to be highly satisfactory and to give highly satisfactory or the best results up to the present time, in naming this particular plastic or synthetic resin there is no intention to limit the invention to its use.

The two body members making up the article, or making up the lower or bottom portion of the receptacle, reference not being had to the cover or top therefor, are individually molded and each is complete in itself and one is introduced into and tightly and securely locked to the other without the employment of accessory securing elements, without the use of solvents or adhesives or thermo treatment.

The outer body member or shell 10 comprises the circular or cylindrical wall 14 joined to the solid bottom wall 16. The wall 14 is preferably of uniform or constant thickness throughout except in those portions where the hereinafter referred to reinforcing and locking ribs are formed and the top of the wall 14 is defined by the inwardly turned flange or collar 18. This collar 18 has a flat top surface 20 while the under side or under face slopes or tapers slightly toward the edge of the collar as indicated at 21.

Molded integrally with the inner side or top of the bottom wall 16 is a plurality of pairs of short, spaced locking ribs 22. These pairs of ribs are arranged in closely spaced relation around the inner surface of the wall 14 and are joined to the wall at their outer ends and extend inwardly therefrom as shown in Fig. 5, being also joined in the molding operation with the bottom wall 16 as above stated.

The ribs of each pair are parallel and are arranged so that a line passing centrally therebetween is radial to the bottom wall 16 of the shell and these radial lines are equidistantly spaced around the entire circumference of the wall 14 as is clearly shown, there being, preferably, approximately sixteen sets of the locking ribs in all. Obviously, however, the number of sets of ribs may vary with the size of the receptacle. Therefore, it is to be understood that the invention is not limited with respect to the number of the pairs of ribs.

In addition to the pairs of short inwardly extending ribs 22, the side wall 14 of the outer body member has formed integral therewith a number of vertical locking ribs 23, four being here shown.

As is clearly shown in Figs. 5 and 6, each of these vertical ribs 23, which is molded into the wall 14, joins one of the short inwardly extending ribs 22. Thus each vertical rib 23 and the short rib 22 which it joins forms, as shown in Fig. 2, a substantially L-shaped reinforcement for the side and bottom walls 14 and 16.

The vertical ribs 23 stop at their upper ends short of the inturned flange or collar 18 so as not to interfere with a part of the hereinafter described inner or cup-like body member 12.

The cup-like inner body member 12 comprises the circular side wall portion 24 and the bottom wall 24'. It is preferred that the side and bottom walls 24 and 24' be joined by the widely or generously rounded circular corner as indicated at 25.

The bottom wall 24' has formed integral therewith in the molding operation, the four locking lugs 26 which are equidistantly spaced around the bottom.

Joining the outer ends of the locking lugs 26 and molded integral with the outer surface of the wall 24 are vertical ribs 27. These ribs at their lower ends join with the adjacent lugs 26 to form a relatively sharp angle or corner 28.

Each of the lugs 26 is of a length slightly greater than the length of the pairs of ribs 22 between which they are designed to engage in the assembled structure and each of the vertical ribs 27 is joined at its top end with an encircling locking ring as hereinafter described.

The cup-like inner member is of smooth or straight wall form throughout its inner surface while the exterior thereof is defined by the relatively wide top or head band 29.

Encircling the inner body member 12 beneath the head band 29 is a locking ring 30 which is spaced from the lower or bottom edge of the band 29 to form the encircling locking channel 31.

The overall diameter of the locking ring 30 is of approximately the same as the overall or outside diameter of the head band 29 and the diameter of the bottom of the channel or groove 31 is approximately equal to the inside diameter of the flange 18 of the opening which the flange defines.

The locking ring has a downwardly inclined or sloping top surface 32 and an opposite upwardly inclined or sloping under face or surface 33. These faces 32 and 33 are, therefore, in outwardly convergent relation.

The upper side of the channel 31 is defined by the flat radial face 34, which forms the bottom of the head band 29 and the width of the channel 31 between these faces 32 and 34 approximates the thickness of the flange 18 which engages therein in the assembled pot or receptacle.

As will be seen the overall or outside diameter of the inner body member 12 below the locking ring 30 is materially less than the inside diameter of the shell 10 between the flange 18 and the bottom 16 and the overall diameter of the locking ring 30 is slightly less than the inside diameter of the shell 10 below the flange 18.

Above the locking channel or groove 32 the head band 29 is molded to provide the thread rib 35 for coaction with corresponding threads, or other means, carried by a closure cap 36 which is illustrated as being of conventional form and which may be molded of plastic either of the same character as that for the body of the receptacle or of any other suitable character or it may be molded of any other material suitable for use.

As illustrated the vertical wall ribs 27 upon the wall 24 of the inner body member 12 are joined in the molding operation with the locking band 30. The ribs 27 project from the surface of the wall 24 the same distance as the rib 30 as is clearly shown in Fig. 3. Thus these ribs 27, being connected to the locking rib 30 add materially to the rigidity of the wall and also coact, in the manner hereinafter set forth, with the ribs 23 carried by the outer body member wall 14 to secure the two bodies against relative movement.

In order to prevent deformation of the inner body 12, as the top part thereof, the locking rib 30 has a rigidifying means embedded therein in the form of a wire 37 which completely encircles the inner body as is most clearly shown in Fig. 4.

As hereinabove stated the two body members 10 and 12 making up the completed pot or receptacle, are molded separately and individually of the desired plastic which, as stated, is preferably polyethylene, and are then assembled by inserting the lower part of the inner cup-like body member 12 into the outer member.

As the plastic of which the body members are formed is of a yieldable nature it will be understood that the flange 18 will be rather flexible so that the locking connection between the body members may be effected primarily by means of the interengagement of the flange 18 and the circular channel or groove 31 by pressing directly inwardly on the top of the inner body member 12 so that the top face or surface 20 of the flange 18 will press against the outwardly and upwardly inclined under surface 33 of the locking ring 30 and be flexed downwardly or inwardly. At the same time the flange will slide outwardly on the surface 33 until the edge of the flange rides across the outer face of the locking rib whereupon the inherent elasticity of the plastic material will cause the flange to snap back to its substantially right angular relation with the wall 14 and enter the locking groove 29.

In entering the locking groove the inclined under face 21 of the flange 18 will slide inwardly and upwardly along the top face 32 of the locking ring and since the flange and the top part of the outer body member will have been stretched slightly in the passing of the flange over the outer face of the locking ring 30, the flange will contract in the groove and form a tight locking connection with the top of the inner body member 12, pressing tightly against the bottom of the groove and against the under face 34 which forms the upper side of the locking groove.

Since, as above stated, the thickness of the flange 18 conforms with the width of the locking channel or groove 31 from the bottom thereof outwardly to the outer side of the locking ring it will be seen that when the flange is thus engaged in the groove or channel a very tight joint will be effected and in the use of the plastic material named the line of joiner between the top of the locking flange and the lower part of the head band 29 will be substantially invisible.

In the action of coupling the inner and outer body members together in the manner stated, that is, in forcing the inner body member down into the outer body member to effect the engagement of the flange 18 in the annular channel 31, the locking lugs 26 on the bottom of the inner body member will each enter between a pair of the locking ribs 22, or if the inner body member is not in the right position to effect the immediate entry of the lugs 26 between the pairs of ribs 22 a slight turning of the inner body member will permit such entry so that the lugs will ride across the top of adjacent ribs 22 and snap down in between the ribs. The flexible or resilient character of the plastic material will permit this action.

The entrance of the locking lugs 26 each between a pair of ribs 22 wtihout difficulty can be effected by turning the inner body member 12 after the lower part thereof has been inserted into the outer body member and before the inner body member has been forced down to force the flange 18 across the locking rib 30, until the side wall ribs 27 of the inner body member come into engagement each against a side of a vertical rib 23 carried by the wall 14 of the outer body member 10. When the two members are then forced together to engage the locking rib 18 in the annular groove 31 the lugs 26 will be in proper position for each to enter between a pair of ribs 22.

Upon reference to Fig. 2 it will be seen that the height of the inner body member 12 between the bottom 24' thereof and the locking channel 31, is considerably less than the interior height of the outer body member 10 so that the bottom 24' of the inner body member clears the tops of the ribs 22 and also the locking lugs 26 may clear the bottom 16 of the outer body member. The dimensions, however, may be made such, if desired, as to bring the bottom of the inner body member against the tops of the ribs 22 and also bring the bottom edges of the locking lugs 26 against the bottom 16 of the outer body member. Also the thickness of the lugs 26 may be such as compared to the spacing between the pairs of ribs 22 as to effect a tight engagement of each lug between its pair of ribs.

The vertical ribs 23 and 27 when located in side-by-side relation cooperate with the lugs 26 and the ribs 22 to prevent relative rotation or movement between the two body members. Also the vertical ribs strengthen the side walls of the two body members as hereinbefore stated and resist deformation of the walls under pressure applied thereto, particularly if the outer body member is subjected to any squeezing pressure.

By the provision of the rigidifying means in the form of the wire 37 embedded in the locking rib 30 deformation of top part of the inner body member 12 is resisted so that the two body members cannot easily be separated after they have been joined together in the manner stated without destroying the receptacle.

The interengaging ribs and lugs also effectively resist any possible relative turning movement such as might occur if such lugs were not provided, in the act of screwing on the cover or lid 36 or unscrewing it from the top part 29 of the inner body member. Also it will be readily apparent that when the cover or cap is placed on the receptacle and screwed down by means of the threads 35, the bottom edge of the cap will come into contact with and press against the top of the flange 18 thereby forming a tight seal between these parts.

From the foregoing it will be seen that there is provided by the present invention a plastic container or receptacle in the form of a conventional ointment or cosmetic pot or jar wherein the parts are so designed that after being removed from the forming mold they can be easily and quickly assembled and tightly locked together by the action of forcing the inner body member 12 into the outer body member in the manner above described. This action completes the locking coupling between the body member parts and avoids the use of any auxiliary joining or securing elements for holding the parts together.

It will also be apparent that due to the novel manner in which the locking flange 18 and channel 31 are joined a substantially air tight connection is effected thereby setting up in the space between the side and bottom walls a dead air chamber which will have a certain insulation value so that easily liquified materials cannot be affected by outside heat unless it be of extreme character.

I claim:

1. A receptacle of the type described comprising an outer member embodying a side wall and a bottom and having an open top, an inner cup member having a major lower portion extending into the outer member through said open top, an interlocking coupling between the outer member around the opening and the cup member, and means between the outer member side wall and the adjacent opposing part of the cup member securing the two members against relative rotative movement, said interlocking coupling comprising an inwardly extending flange carried by the outer member side wall and a locking groove in and encircling the cup member into which said flange tightly engages, the groove being defined on the lower side by a rib and said means embodying a rib on the wall of the cup member extending down from the groove defining rib and a means on the inner side of said side wall of the outer member in abutting relation with the wall rib.

2. A receptacle of the type described comprising an outer and an inner member in nested relation, the outer member having a side wall, a bottom and an open top, the inner member having a side wall, a bottom and an open top and extending into the outer member and having a portion of its top encircled by the open top of the outer member, an interlocking coupling between said members comprising an annular flange carried by one member and an annular locking groove carried by the other member into which said flange is tightly engaged, the said one of the members carrying the groove being formed of a normally flexible material, and a rigidifying means stiffer than and embedded in the said flexible material upon one side of said groove to resist deformation of the said one member.

3. A receptacle of the type described comprising an outer and an inner member in nested relation, the outer member having a side wall, a bottom and an open top, the inner member having a side wall, a bottom wall and an open top, the side wall of the inner member being defined by a thickened head band and an annular locking rib spaced therebelow forming a locking groove, an annular flange extending inwardly from the top of the side wall of the outer member and defining the top opening of the outer member, said inner member having the portion thereof below said groove lying within the outer member and said flange being tightly engaged in said groove, said members being formed of a resilient material, and a body of rigidifying material of materially greater stiffness than the material of the bodies embedded in said annular locking rib for resisting deformation of the inner member and separation from the flange of the outer member.

4. The invention according to claim 3, wherein said rigidifying body comprises a metal annulus.

5. The invention according to claim 4, with coacting members carried by the side walls of the two members upon their confronting sides for stiffening said walls and opposing turning of the inner member within the outer member.

6. The invention according to claim 3, with reinforcing ribs formed integral with and vertically on the outer side of the side wall of the inner member and radial lugs upon the under side of the bottom wall of the inner member, ribs formed vertically on the inner side of the side wall of the outer member, said ribs being of a width to overlap and abut one with the other, and means upon the inner side of the bottom of the outer member with which said lugs form an interlocking connection.

7. The invention according to claim 3, wherein the side walls of the members are spaced apart below the engaged flange and groove and wherein the bottom walls are also spaced apart, ribs formed vertically on the outer side of the side wall of the inner member, ribs formed vertically on the inner side of the side wall of the outer member, said ribs being of a width to overlap and abut one with the other, and wherein the said rigidifying body comprises a stiff wire annulus.

8. The invention according to claim 7, wherein the ribs upon the side wall of the inner member are joined at their top ends with the annular locking rib.

9. A receptacle of the type described comprising an outer and an inner member in nested relation, the outer member having a side wall, a bottom and an open top, the inner member having a side wall, a bottom wall and an open top, the side wall of the inner member having an annular locking groove adjacent to its upper end, an annular flange extending inwardly from the top of the side wall of the outer member and defining the top opening of the outer member, said inner member having the portion thereof below said groove lying within the outer member and said flange being tightly engaged in said groove, said members being formed of a resilient material, and a body of rigidifying material of materially greater stiffness than the material of the bodies embedded in said annular locking rib for resisting deformation of the inner member and separation from the flange of the outer member.

References Cited in the file of this patent

UNITED STATES PATENTS

| | | |
|---|---|---|
| 2,076,549 | Conner | Apr. 13, 1937 |
| 2,076,550 | Conner | Apr. 13, 1937 |
| 2,121,382 | Conner | June 21, 1938 |